(12) United States Patent
Giustiniano et al.

(10) Patent No.: US 12,413,310 B2
(45) Date of Patent: Sep. 9, 2025

(54) RF BACKSCATTER SYSTEM BASED ON LIGHT FIDELITY

(71) Applicant: FUNDACION IMDEA NETWORKS, Madrid (ES)

(72) Inventors: Domenico Giustiniano, Madrid (ES); Borja Genoves Guzman, Madrid (ES); Muhammad Sarmad Mir, Madrid (ES)

(73) Assignee: FUNDACION IMDEA NETWORKS, Madrid (ES)

( * ) Notice: Subject to any disclaimer, the term of this patent is extended or adjusted under 35 U.S.C. 154(b) by 0 days.

(21) Appl. No.: 18/261,271

(22) PCT Filed: Oct. 7, 2022

(86) PCT No.: PCT/EP2022/077924
§ 371 (c)(1),
(2) Date: Jul. 13, 2023

(87) PCT Pub. No.: WO2023/057618
PCT Pub. Date: Apr. 13, 2023

(65) Prior Publication Data
US 2024/0080098 A1 Mar. 7, 2024

(30) Foreign Application Priority Data
Oct. 8, 2021 (EP) .................................. 21382908

(51) Int. Cl.
*H04B 10/116* (2013.01)
*H04B 10/50* (2013.01)

(52) U.S. Cl.
CPC .......... *H04B 10/116* (2013.01); *H04B 10/502* (2013.01)

(58) Field of Classification Search
CPC .......................... H04B 10/116; H04B 10/502
(Continued)

(56) References Cited

U.S. PATENT DOCUMENTS

| 11,750,284 B2 * | 9/2023 | Carraro ............. H04B 10/1149 |
| | | 398/118 |
| 2010/0013309 A1 | 1/2010 | Rosenblatt et al. |

(Continued)

FOREIGN PATENT DOCUMENTS

JP 2000060021 A 2/2000

OTHER PUBLICATIONS

Obeed Mohanad et al: "DC-Bias and Power Allocation in Cooperative VLC Networks for Joint Information and Energy Transfer", IEEE Transactions on Wireless Communications, IEEE Service Center, Piscataway, NJ, US, vol. 18, No. 12, Dec. 1, 2019 (Dec. 1, 2019), pp. 5486-5499, XP011760026, ISSN: 1536-1276, DOI: 10.1109/TWC.2019.2936572 [retrieved on Dec. 9, 2019] p. 5488 figures 1,2.

(Continued)

*Primary Examiner* — Dalzid E Singh
(74) *Attorney, Agent, or Firm* — S.J. Intellectual Property Limited

(57) ABSTRACT

The present invention is related to a low-power backscatter system comprising a LiFi, "Light Fidelity", transmitter configured for generating and transmitting an optical signal comprising a sequence of a downlink data signal and a chirp signal and an IoT, "Internet of Things", tag.

14 Claims, 3 Drawing Sheets

(58) Field of Classification Search
USPC .......................................................... 398/172
See application file for complete search history.

(56) References Cited

U.S. PATENT DOCUMENTS

| | | | | |
|---|---|---|---|---|
| 2015/0311944 | A1* | 10/2015 | Gollakota | H04B 1/40 375/219 |
| 2016/0119060 | A1* | 4/2016 | Byers | H04L 1/0002 398/118 |
| 2022/0224583 | A1* | 7/2022 | Rosenthal | H04L 27/02 |
| 2024/0430008 | A1* | 12/2024 | Wendt | H04B 10/40 |

OTHER PUBLICATIONS

Zhao Wen et al: "An Experimental Analysis of Pipe Inspection using Solar Panel Receiver for Visible Light Communication and Energy Harvesting", 2020 IEEE/ASME International Conference on Advanced Intelligent Mechatronics (AIM), IEEE, Jul. 6, 2020 (Jul. 6, 2020), pp. 1848-1853, XP033807606, DOI: 10.1109/AIM43001.2020.9158956 figure 3.

Galisteo Ander Ander Galisteo@Imdea Org et al: "Two to tango hybrid light and backscatter networks for next billion devices", Proceedings of the 18th International Conference on Mobile Systems, Applications, and Services, ACMPUB27, New York, NY, USA, Jun. 15, 2020 (Jun. 15, 2020), pp. 80-93, XP058465948, DOI: 10.1145/3386901.3388918 ISBN: 978-1-4503-7954-0 figure 2.

Rezaei Fatemeh et al: "Large-Scale Wireless-Powered Networks With Backscatter Communications—A Comprehensive Survey", IEEE Open Journal of the Communications Society, IEEE, vol. 1, Jul. 27, 2020 (Jul. 27, 2020), pp. 1100-1130, XP011804958, DOI: 10.1109/OJCOMS.2020.3012466 figure 2.

\* cited by examiner

RF BACKSCATTER SYSTEM BASED ON LIGHT FIDELITY

TECHNICAL FIELD OF THE INVENTION

The present invention belongs to the field of RF backscatter systems, namely to Low-Power and Long-Range RF backscatter systems. More in particular, it relates to an architecture for a system which implements LiFi communication technology for downlink to a low-power IoT device, along with RF backscatter system for uplink.

BACKGROUND OF THE INVENTION

The internet of things, or IoT, is a concept that refers to and defines an ecosystem of interrelated computing systems and devices, such as mechanical and digital machines, objects (and even living subjects), that are provided with unique identifiers (UIDs), and are connected to peripherals such as, for example, embedded sensors, as well as with the ability to connect and exchange data over a network, such as the Internet, without requiring human-to-human or human-to-computer interaction.

Some of the advantages of IoT include the ability to access information from anywhere at any time on any device; improved communication between connected electronic devices; transferring data packets over a connected network saving time and money; and automating tasks helping to improve the quality of business's services and reducing the need for human intervention.

The large-scale deployment of Internet of Things devices in the past decades has led to technological innovations in a wide range of applications such as smart cities, smart homes, robotics, transport, wireless sensor networks, control systems, thermostats, security systems and cameras and even healthcare systems. Said deployment of innumerable devices equipped with IoT technology necessarily implies the implantation of billions of sensors in the near future, which in turn supposes the massive and necessary implementation of respective power systems, such as batteries, configured to provide energy to those sensors and/or IoT devices.

Although batteries in tiny form factor may last for a long time, even years, any computation and communication can quickly deplete them, resulting in a limited network lifetime. Additionally, batteries have also a negative environmental impact, as consumers currently dispose of billions of batteries per year and battery recycling is a delicate matter.

The research efforts in low-power system, and, in particular, battery-free systems, exploit low-power electronics, communication and processing techniques that have led the industry to focus on the development of radio-frequency (RF) backscatter technology as a promising alternative for dealing with said challenge. In particular, RF backscatter is now a consolidated technology for transmitting IoT data to the network because of its energy efficiency and absence of power-hungry active radio for transmission.

More in particular, RF backscatter absorbs and reflects the surrounding radio waves, from any available RF sources or dedicated infrastructural elements, to communicate with battery-free devices. On these devices, achieving a low-energy consumption for every device is essential to enable its operation on the small amounts of energy harvested from the ambient environment. On the RF backscatter devices, oscillators, which dominate the overall energy consumption, are often combined with other circuits for communication, which further pushes the complexity and energy consumption.

In this regard, the scarce amount of harvested energy from the environment limits the communication and processing capabilities. Accordingly, the current solutions developed and implemented in the industry for several systems comprising RF backscatter architecture technologies have several major limitations, such as short transmission range or low data rate.

SUMMARY OF THE INVENTION

The present invention provides a solution for the aforementioned problems, by proposing a low-power backscatter system according to claim 1. In the dependent claims, preferred embodiments of the invention are defined.

In a first inventive aspect, the invention provides a backscatter system comprising:
  a LiFi, "Light Fidelity", transmitter configured for generating and transmitting an optical signal comprising a sequence of a downlink data signal and a chirp signal, the chirp signal varying from a frequency $f_1$ to a frequency $f_2$;
  an IoT, "Internet of Things", tag comprising:
    a LiFi receiver comprising a harvester, the LiFi receiver being configured for
      receiving the optical signal from the LiFi transmitter;
      converting the optical signal into an electrical signal;
      separating the electrical signal into a DC, "direct current", component and an AC, "alternating current", component;
      digitalizing the AC component of the electrical signal;
      harvesting energy from the DC component into the harvester; and
      separating the digitalized AC component of the electrical signal into an AC downlink data signal and an AC chirp signal;
      processing the AC downlink data signal by means of the controller;
      sending the AC chirp signal to a signal selector;
    a controller configured for
      receiving and processing the AC downlink data signal,
      receiving an information signal from at least one external device and/or for generating an information signal; and
      optionally for processing the information signal;
    the signal selector comprising a multiplexor with two inputs, the first input being connected to ground and the second input being connected to the LiFi receiver for receiving the AC chirp signal, wherein the signal selector is configured for
      receiving, from at least one external device and/or from the controller, an information signal;
      selecting, by means of the multiplexor, the AC chirp signal or ground signal according to the information signal;
      sending the selection of AC chirp signal or ground signal to an RF backscatter module;
    the RF backscatter module comprising an absorption impedance, a reflective impedance, an RF switch and an RF antenna, the RF switch being connected to the RF antenna and being connectable to the absorption impedance and to the reflective impedance, the absorption impedance being configured for minimizing the reflection coefficient of the RF antenna and the reflective impedance being configured for maximizing the reflection coefficient of the RF antenna, and the RF backscatter module being configured for receiving an RF carrier signal, with frequency $f_c$, from a carrier generator;

receiving, by the RF switch, the selection of AC chirp signal or ground signal made by the signal selector, wherein if the RF switch receives a ground signal as input:
the RF switch is connected to the absorption impedance;
the absorption impedance absorbs all the energy of the RF carrier signal to avoid that the RF antenna backscatters any signal;

if the RF switch receives an AC chirp signal as input:
the RF switch varies the impedance of the RF antenna by changing its connection between the reflective impedance and the absorption impedance at a frequency equal to the frequency of the AC chirp signal;
the RF antenna generates an RF signal by multiplying its reflection coefficient by the RF carrier; and
the RF antenna backscatters the RF signal varying the frequency of the RF carrier signal from $f_c+f_1$ to $f_c+f_2$.

Both the previously described RF backscatter technology and the LiFi, "Light Fidelity" technology cooperate complementary in the present invention. Regarding the latter, LiFi technology belongs to a field called Visible Light Communication (VLC) according to which data is transmitted using visible light in a networked system. More in particular, LiFi is a wireless communication that is capable of transmitting data at high speeds over the visible light, ultraviolet, and infrared spectrums, although current developments are mainly oriented to the use of LED lamps for the transmission of data in visible light, given that LED bulbs can be operated so as to flicker at such a speed that it is imperceptible to the human eye, but perceptible to a photoreceptor that must be connected to a device.

An encoder is normally connected to the LED bulb attached to the luminaire, such that the signal reaches the encoder and the light bulb is turned on or off to transmit the data received to a photoreceptor which is placed in an area exposed to the light. The photoreceptor then interprets this data transmitted as light flickering as a digital signal, allowing to establish a connection thereby.

In this regard, the downlink side of the backscatter system of the invention, that is, the LiFi transmitter, is configured for generating and transmitting an optical signal comprising a sequence of a downlink data signal and a chirp spread spectrum signal (or simply chirp signal) which is emitted for downlink transmission to the receiving side of the system, that is, the IoT tag.

Downlink data signal must be understood as a signal used for downlink communication in which the light intensity is varied, as in traditional systems, at a fixed clock rate to send data. Its use depends on the application; for example, in home automation, the downlink data signal can be used to send commands to the IoT tag to wake-up and to perform a measure in the room (such as measures of the temperature, of the humidity, of the light intensity . . . ). Thus, the tag will perform the measure and send it back via uplink. Alternatively, the tag can send commands to wireless devices to make them control the parameters of the room (for example, the tag can send a command to the thermostat to raise or lower the temperature of the room). Also, the downlink data signal can be used to provide internet access or HD video streaming to users with wireless devices (laptops, cellphone etc) in the room. Another example could be that it is used to update the code of the controller in the IoT tag through remote updates.

Chirp signal must be understood as a clock signal in which the frequency increases or decreases with time from a frequency $f_1$ to a frequency $f_2$, (being $f_1$ and $f_2$ different from each other).

In an embodiment, the chirp signal is an up-chirp signal or a down-chirp. If the frequency increases from $f_1$ to $f_2$, the chirp is called up-chirp (being $f_1$ lower than $f_2$) and if the frequency decreases from $f_1$ to $f_2$, the chirp is called down-chirp (being $f_1$ greater than $f_2$).

In an embodiment, the chirp signal is an up-chirp signal, that is, a clock with varying frequency over the visible light channel that increases over time, as mentioned before. In a more particular embodiment, the up-chirp signal varies from a minimum frequency, $f_1$, which is selected to avoid interference with the carrier frequency, $f_c$, to a maximum one of $f_2=(f_1+BW)$, where BW is the bandwidth of the chirp signal.

In an embodiment, Time Division Multiplexing is used to transmit the downlink data signal in one time slot and the chirp signal in other time slot. According to said embodiment, the LiFi transmitter communicates with the IoT tag sending a LiFi frame at the desired data rate with a packet structure that includes preamble, start frame delimiter (SFD), transmitter identifier, receiver identifier, frame length and payload. After the downlink data frame, the LiFi transmitter recurrently sends the chirp.

In a particular mode, the IoT tag is set in an energy saving mode until the IoT tag is waken up when a preamble and SFD are detected.

Additionally, in an embodiment, given that the LiFi transmitter may operate providing constant illumination, with respect to the codification of the optical signal, the downlink transmission implements line coding, such as Manchester coding, to guarantee constant light level regardless of the bit stream.

The LiFi transmitter, thanks to the optical signal, provides the IoT tag with energy to support low-power or battery-free operation as well as with baseband signals to support downlink communication and oscillations to generate the baseband signal that supports the RF backscatter-based uplink communication channel.

The IoT tag comprises a LiFi receiver, which in turn comprises a harvester, configured for receiving the optical signal from the LiFi transmitter. The IoT tag thus receives said optical signal comprising the sequence of a downlink data signal and the chirp signal and processes it so as to support low-power or battery-free operation and to generate the baseband signal that supports the RF backscatter-based uplink communication channel, by turning the chirp signal on and off over the entire chirp symbol following an on-off keying (OOK) modulation scheme based on the data generated by an external device (or the controller, if needed) to be transmitted in the uplink.

In particular, the LiFi receiver converts the optical signal into an electrical signal. Next, it separates the electrical signal into its DC component, from which the energy is extracted for harvesting, and its AC component. The AC component of the electrical signal is then digitalized and separated into the AC component of the downlink data signal and the chirp signal. Finally, the LiFi receiver sends the AC chirp signal to a signal selector.

In an embodiment, the LiFi receiver comprises two photosensitive devices: one for the optical signal reception and one for energy harvesting.

In an embodiment where space constraints exist, the LiFi receiver comprises just one photosensitive device, then requiring separation of the received signal into its DC component for energy harvesting and AC component for signal reception. Preferably, the photosensitive device is a solar cell or an array of solar cells.

The IoT tag further comprises a controller, understood as means for processing data such as a processor, a microcontroller or a microprocessor, which receives the AC downlink data signal to analyze it; that is, the controller interprets the commands of said AC downlink to perform a specific action, for example, to order the IoT tag to measure the humidity inside a room. By means of the RF backscatter technology, the IoT tag will send said measure to an RF backscatter receiver.

The IoT tag additionally comprises a signal selector with a multiplexor of two inputs. The first input is connected to ground and the second input is connected to the LiFi receiver to receive the AC chirp signal. In an embodiment, an external device (for example, a humidity sensor, a thermometer, a mobile phone . . . ), which is measuring a specific parameter, sends an information signal (e.g., the measures themselves) to the multiplexor of the signal selector so that said multiplexor selects one input or the other depending on the information signal (e.g. the values of the measures).

In case the information signal is not a binary signal, the external device firstly sends the information signal to the controller, which processes the signal to convert it into a binary signal, and then the controller sends the processed information signal to the multiplexor. In an embodiment, the information signal is generated directly from the controller, which then sends said information signal to the multiplexor.

The information signal should be understood as a data signal with a certain information, as the measures made by an external sensor or controlling data generated by the controller.

The signal selector also sends the selection of AC chirp signal or ground to an RF backscatter module.

It must be noted that the multiplexor is a component of ultra-low power consumption, so the design of this signal selector helps the IoT tag to be battery-free or low-power.

In an embodiment, the signal selector is configured to:
select the AC chirp signal if information signal is '1' and selects the ground signal if information signal is '0'; and
select the AC chirp signal if information signal is '0' and selects the ground signal if information signal is '1'.

Therefore, the tag performs On-Off-Keying (OOK) modulation over chirp signals for uplink transmission.

In order for the system to be able to backscatter the information signal to a receiver to be interpreted, for example, to receive a humidity value or the temperature of the room, the IoT tag further comprises the RF backscatter module mentioned before.

Said RF backscatter module comprises an absorption impedance, a reflective impedance, an RF switch and an RF antenna, the last two being connected one to another. The RF switch changes the impedance of the antenna depending on its connection; that is, it can be connected to an absorption impedance to minimize the reflection coefficient of the RF antenna or to a reflective impedance to maximize said reflection coefficient. The RF switch only can be connected to one of the impedances at the same time.

The RF backscatter module receives, from an external carrier generator, an RF carrier signal with a frequency $f_c$ and additionally receives the output of the multiplexor. The RF switch of the module is governed by the output of the multiplexor so that, if the RF switch receives the ground signal from the signal selector, it is connected to the absorption impedance to absorb the energy of the RF carrier signal so that the RF antenna does not backscatter any signal. Otherwise, that is, if the RF switch receives the AC chirp signal, it varies the impedance of the RF antenna by changing its connection between the reflective impedance and the absorption impedance at a frequency equal to the frequency of the AC chirp signal. Then, the antenna generates an RF signal by multiplying the RF carrier signal and its reflection coefficient, which is being modulated by the impedance changes, and backscatters said RF signal.

The RF switch comprises a 'Control' input to which the AC chirp signal is connected so that the RF switch increases or decreases the speed with which it changes its connection depending upon the frequency of the AC chirp signal at its Control input.

It must be noted that the relationship between the impedance of the RF antenna, the absorption/reflective impedances and the reflection coefficient is given by the next formula:

$$\Gamma_T = \frac{Z_L - Z_A}{Z_L + Z_A}$$

wherein $\Gamma_T$ is the reflection coefficient, $Z_L$ is the absorption or reflective impedance and $Z_A$ is the impedance of the RF antenna.

In an embodiment, the backscatter system further comprises an RF backscatter receiver configured for
receiving the backscattered RF signal from the RF backscatter module; and
decoding the backscattered RF signal.

The design of the system, advantageously, allows the LiFi transmitter to provide a double function. On one side, the LiFi transmitter operates communicating downlink data using a traditional constant clock rate, as mentioned before. On the other side, the LiFi transmitter uses a clock rate which changes based on the desired bandwidth and the chirp time so as to generate the baseband signal needed by the IoT tag to transmit RF backscatter in uplink transmission. More advantageously, according to the second function of the LiFi transmitter, the presence of a clock (i.e., oscillators) in the very own IoT tag is prevented, thus reducing its complexity and energy consumption. In this way, the IoT tag can be battery-free or low-power.

Another advantage of the system is that the implementation of the chirp signal using visible light allows to achieve longer range of transmission between the IoT tag and the RF backscatter receiver, by virtue of the features of said chirp signal. In particular, the chirp signal uses its entire allocated bandwidth, which makes it robust to channel noise as well as resistant to multipath fading even when operating at very low power.

The main advantages of the system, as already aforementioned, are that it allows energy saving in the IoT tag thanks to offloading of the oscillator (i.e. the chirp signal) to the LiFi transmitter and removal of power-hungry elements on the tag, transmitting an RF backscatter signal at a meagre power budget and, by virtue of the reconstructed electrical chirp signal, the range of the RF backscatter-based uplink communication is increased.

In an embodiment, the RF backscatter receiver decodes the backscattered RF signal by:
- multiplying the backscattered RF signal by a conjugate chirp;
- applying an FFT, "Fast Fourier Transform", on the signal resultant from multiplying the backscattered RF signal by a conjugate chirp to determine energy at different FFT bins;
- demodulating the resultant transformed signal, such that:
  - symbol '1' corresponds to a peak bin at a FFT bin; and
  - symbol '0' corresponds to no peak at any FFT bins.

As conjugate chirp must be understood a chirp signal with a varying frequency contrary to the varying frequency of the chirp signal transmitted by the LiFi transmitter; that is, if the LiFi transmitter transmits an up-link chirp from $f_1$ to $f_2$, the demodulation will require a down-chirp from $f_2$ to $f_1$ and, conversely, if the LiFi transmitter transmits a down-link chirp from $f_2$ to $f_1$, the demodulation will require an up-chirp from $f_1$ to $f_2$; in the case where $f_1$ is lower than $f_2$.

In the context of the invention, the demodulated signal will have two possible symbols: '1' or '0'. Said demodulation would firstly require performing an FFT on the signal resultant from multiplying the received backscattered RF signal and the conjugate chirp. The transformed signal comprises a set of FFT bins that are interpreted by the RF backscatter receiver as said symbols '1' or '0'. Symbol '1' is received when a peak is obtained in the FFT bins whereas symbol '0' is received when no peak is obtained in the FFT bins.

In an embodiment, the LiFi receiver comprises filtering means configured for removing noise from environmental and ambient illumination sources. In a preferred example, the filtering means comprise a high-pass filter to remove the low frequencies and DC components from environmental and ambient illumination sources.

In an embodiment, the LiFi receiver comprises a comparator to carry out the digitalization of the AC component of the electrical signal. As LiFi communication requires a baseband signal as sharp as possible, the use of a comparator is an effective way of digitalization with just distinguishing high and low signal values.

In an embodiment, the LiFi receiver further comprises a voltage regulator configured to control the voltage supplied to the controller and the comparator, if any.

In an embodiment, the LiFi receiver is further configured for harvesting energy from ambient light.

In an embodiment, the absorption impedance is a matching circuit.

In an embodiment, the LiFi receiver further comprises a low pass filter configured for eliminating the AC component of the electrical signal and for obtaining the DC component of the electrical signal and for sending the DC component to the harvester; and a high pass filter configured for eliminating the DC component of the electrical signal and obtaining the AC component of the electrical signal.

In an embodiment, the harvester comprises a capacitor and/or a rechargeable battery. In a preferred embodiment, the energy of the DC component is harvested in said capacitor.

In an embodiment, the LiFi receiver further comprises at least one solar cell, the at least one solar cell being configured for:
- receiving the optical signal from the LiFi transmitter;
- converting the optical signal into an electrical signal;
- sending the electrical signal to the low pass filter and the high pass filter.

A solar cell is typically used for harvesting energy from light, and it provides the best trade-off between the level of energy provided and the availability of sources. Additionally, given that the electrical signal at the output of the cell is decoupled into a DC component and an AC component, a solar cell can be used both for communication and energy harvesting.

Efficiency is increased thereby, using the whole area of the cell for exploiting all the available light energy and thus reducing the size of the tag compared to systems which use different solar cells for communication or harvesting or which use a single cell alternating its operating mode.

For a given space dedicated to solar cells, in such systems which use different solar cells for communication or harvesting or which use a single cell alternating its operating mode the latency required for harvesting enough energy would greatly reduce the time left for a single battery-free or low-power device to communicate data, and therefore the time needed to harvest energy could disrupt any protocol that needs to use the same solar cell for communication.

In an embodiment, the at least one solar cell is an array of solar cells connectable among them in parallel or in series.

According to this embodiment, and like the embodiment where only one solar cell is used, all the set of solar cells are used for both harvesting and communication.

With respect to the type of connection established between the solar cells, the harvesting improves considerably (time-to-charge decreases) with multiple solar cells connected in parallel, while the communication worsens slightly, due to a lower $V_{PP}$ (peak-to-peak voltage) value. On the other hand, when multiple solar cells are connected in series, the communication is boosted (larger $V_{PP}$) and the time-to-charge slightly decreases.

In an embodiment, the type of connection is reconfigurable automatically according to a predetermined condition. In particular, the LiFi receiver comprises a solar cells configuration module, which is configured for measuring the energy harvested in the harvester; if the energy measured is equal or above a predefined threshold, the solar cells configuration module may connect the array of solar cells in series to boost the communication; and if the energy measured is below a predefined threshold, solar cells configuration module may connect the array of solar cells in parallel to boost harvesting.

In an embodiment, the predefined threshold is equal to the minimum energy that the IoT tag needs to operate with a certain predefined margin.

In an embodiment wherein the harvester comprises a capacitor, the decision of parallel or series connection of solar cells is based on $V_{BAT}$, which is the voltage across the capacitor to store the harvested energy. In particular, when harvesting is the priority due to low charge on capacitor, solar cells are connected in parallel; when harvesting is not priority, to boost the communication, they are connected in series.

In any case, regardless of the particular operation mode priority, choosing between boosting harvesting or communication, both actions occur simultaneously.

In a second inventive aspect, the invention provides a LiFi receiver comprising a harvester, an array of solar cells, a solar cells configuration module, a low pass filter and a high pass filter, wherein
the array of solar cells is configured for:
- receiving an optical signal from a LiFi transmitter;
- converting the optical signal to an electrical signal; and sending the electrical signal to the low pass filter and the high pass filter;
the low pass filter is configured for:
eliminating the AC component of the electrical signal;
obtaining the DC component of the electrical signal; and
sending the DC component to the harvester; and
the high pass filter is configured for:
eliminating the DC component of the electrical signal; and
obtaining the AC component of the electrical signal;
the solar cells configuration module is configured for
measuring the energy harvested in the harvester;
if the energy measured is equal or above a predefined threshold, connecting the array of solar cells in series; and
if the energy measured is below a predefined threshold, connecting the array of solar cells in parallel.

The LiFi receiver, which is suitable for being part of an Internet of Things, IoT, tag of the backscatter system of the first inventive aspect, comprises a harvester, an array of solar cells, a low pass filter, a high pass filter and a solar cells configuration module.

The array of solar cells is configured for receiving an optical signal from a LiFi transmitter, to convert said optical signal into an electrical signal and to send the electrical signal to the filters mentioned before. The low pass filter is configured for eliminating the AC component of the electrical signal, for obtaining the DC component of the electrical signal and for sending the DC component to the harvester. The high pass filter is configured for eliminating the DC component of the electrical signal and obtaining the AC component of the electrical signal.

In an embodiment, the high pass filter is further configured for eliminating the DC component from ambient light.

The solar cells configuration module is configured for measuring the energy harvested in the harvester and for connecting the array of solar cells in series and in parallel according to the energy measured.

The harvesting improves considerably (time-to-charge decreases) if solar cells are connected in parallel, while the communication worsens slightly, due to a lower $V_{PP}$ (peak to peak voltage) value. On the other hand, when the solar cells are connected in series, the communication is boosted (larger $V_{PP}$) and the time-to-charge slightly decreases.

The type of connection is reconfigurable automatically by means of the solar cells configuration module, which connects the array of solar cells in series to boost the communication if the energy measured in the harvester is equal or above a predefined threshold; in contrast, if the energy measured is below a predefined threshold, the solar cells configuration module connects the array of solar cells in parallel to boost harvesting.

In an embodiment, the predefined threshold is equal to the minimum energy that the IoT tag, in which the LiFi receiver is suitable to be installed, needs to operate with a certain predefined margin.

In an embodiment, the harvester of the LiFi receiver comprises a capacitor and/or a rechargeable battery.

In an embodiment wherein the harvester comprises a capacitor, the decision of parallel or series connection of solar cells is based on $V_{BAT}$, which is the voltage across the capacitor to store the harvested energy. In particular, when harvesting is the priority due to low charge on capacitor, solar cells are connected in parallel; when harvesting is not priority, to boost the communication, the solar cells are connected in series.

In any case, regardless of the particular operation mode priority, choosing between boosting harvesting or communication, both actions occur simultaneously.

In an embodiment, the LiFi receiver further comprises a comparator to carry out the digitalization of the AC component of the electrical signal.

In an embodiment, the LiFi receiver further comprises a voltage regulator configured to control the voltage supplied to the comparator, if any. Additionally, the voltage regulator can be configured to control the voltage supplied to a controller of the IoT tag in case the LiFi receiver is integrated in said IoT tag.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1:
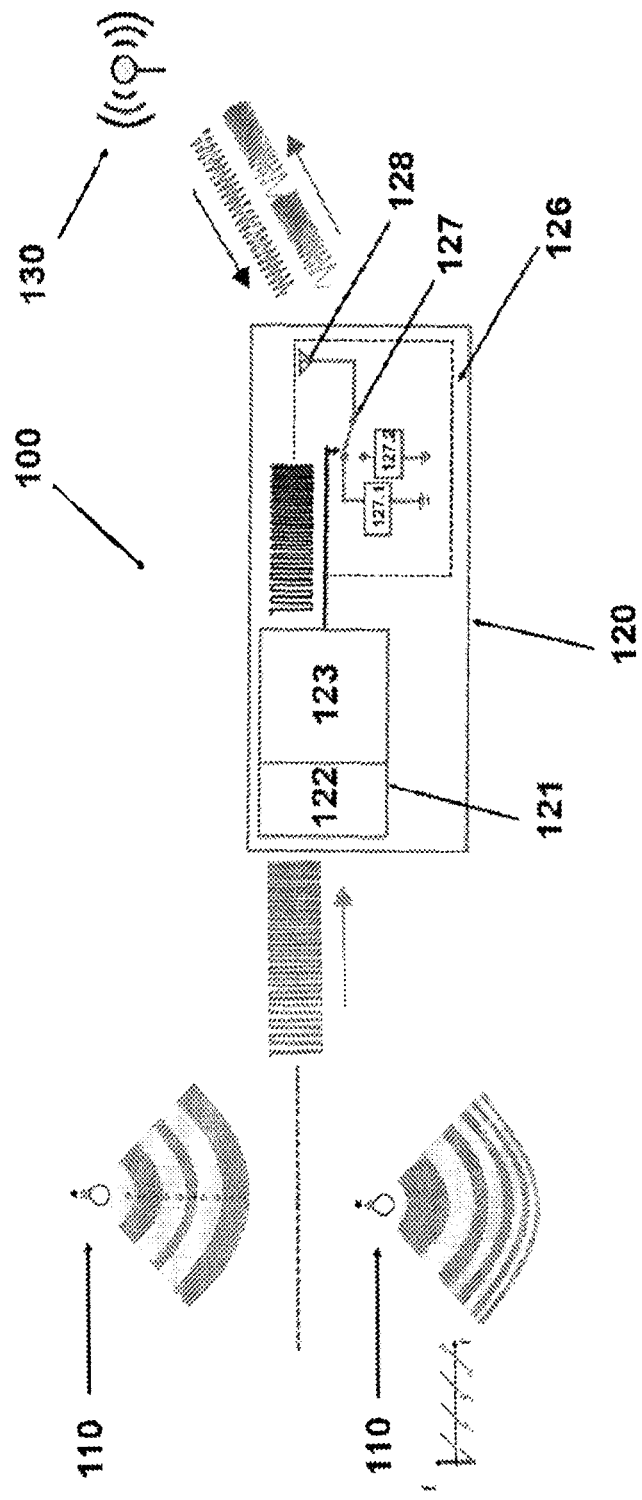
FIG. 1 This figure shows a diagram that schematically represents the architecture of an embodiment of the system of the present invention, as well as the operation and communication between the elements which integrate the system.

FIG. 1 shows a diagram that schematically represents the architecture of an embodiment of the backscatter system (100) of the present invention, as well as the principles of operation and communication between the elements which integrate the system (100).

A LiFi transmitter (110) generates an optical signal (LiFi signal) comprising a sequence of a downlink data signal and a chirp signal which is provided to a battery-free IoT tag (120) which receives and processes the LiFi signal, harvests energy from it, and creates a baseband signal that can be mixed at the IoT tag (120) with an RF carrier signal for uplink communication. This mixed signal is then backscattered by an RF antenna to an RF backscatter receiver (130).

The LiFi transmitter (110) provides the IoT tag (120) with energy to support battery-free operation and with baseband signals to support downlink communication and oscillations to generate the baseband signal that supports the RF backscatter-based uplink communication channel.

The LiFi transmitter (110) is embodied in this example as a LED light bulb which, as it can be seen, is depicted twice, above and below a dashed line, in order to show how the LiFi transmitter (110) may operate. In particular, the LiFi transmitter (110) provides a double function for the backscatter system (100) to operate. On one side, the LiFi transmitter (110) transmits downlink data using a traditional constant clock rate. On the other side, the LiFi transmitter (110) uses a clock rate which changes based on the desired bandwidth and spreading factor so as to generate the baseband signal needed for the uplink communication. In this way, the LiFi transmitter (110) provides the IoT tag (120) with the oscillations necessary to generate the baseband signal that supports the RF backscatter-based uplink communication channel, such that the presence of a clock (i.e., oscillators) in the very own IoT tag (120) is prevented, thus reducing its complexity and energy consumption.

In order to increase the range of the RF backscatter-based uplink communication channel, from the IoT tag (120) to the RF backscatter receiver (130), by using signals less subject to noise, said clock rate with varying frequency over the visible light channel is sent by means of a chirp spread spectrum signal (or simply chirp signal). As can be seen, the chirp signal is schematically depicted in this embodiment as an up-chirp signal, that is, a clock with varying frequency over the visible light channel that increases over time.

The IoT tag (120) comprises a LiFi receiver (121), which in turn comprises a harvester (122), configured for receiving the optical signal from the LiFi transmitter (110). The IoT tag (120) thus receives the optical signal emitted by the LiFi transmitter (110) comprising the sequence of the downlink data signal and the chirp signal and processes it so as to support low power or battery-free operation and to generate the baseband signal that supports the RF backscatter-based uplink communication channel.

In order to carry out said process of optical signal reception and later processing, the LiFi receiver (121) is further configured for converting the optical signal into an electrical signal, for separating the electrical signal into a DC, "direct current", component and an AC, "alternating current", component, for digitalizing the AC component of the electrical signal by means of a comparator (123), for harvesting energy from the DC component into the harvester (122), for separating the digitalized AC component into an AC downlink data signal and an AC chirp signal and for sending the AC chirp signal to a signal selector.

On the other hand, the IoT tag (120) additionally comprises a controller (124) not shown in this figure, said signal selector (125), which is not shown in this figure, and an RF backscatter module (126).

The controller (124) is configured for receiving the AC downlink data signal and for processing said AC downlink data signal.

The signal selector (125) comprises a multiplexor of two inputs. The first input is connected to ground and the second input is connected to the LiFi receiver (121) to receive the AC chirp signal. In an embodiment, an external device (200), for example, a humidity sensor, a thermometer . . . , which is measuring a specific parameter, sends an information signal (i.e., the measures themselves) to the multiplexor of the signal selector (125) so that said multiplexor selects one input or another depending on the values of the measures. The selection is then sent to the RF backscatter module (126).

In a specific example where the information signal is not a binary signal, the external device (200) firstly sends the information signal to the controller (124), which processes the signal to convert it into a binary signal, and then the controller (124) sends the processed information signal to the multiplexor. In other example, the controller (124) generates the information signal directly, not an external device.

The RF backscatter module (126) comprises an RF switch (127) and an RF antenna (128) connected one to another. The RF switch (127) is connectable to an absorption impedance (127.1) configured for minimizing the reflection coefficient of the RF antenna (128) and to a reflective impedance (127.2) configured for maximizing the reflection coefficient of the RF antenna (128).

The RF backscatter module (126) receives an RF carrier signal, with frequency $f_c$, from a carrier generator. The RF backscatter module (126) also receives, by the RF switch (127), the selection of AC chirp signal or ground signal made by the signal selector (125). By virtue of this signal received from the signal selector (125), if the RF switch (127) receives a ground signal as input: the RF switch (127) is connected to the absorption impedance (127.1), which absorbs all the energy of the RF carrier signal to prevent the RF antenna (128) from backscattering any signal.

However, if the RF switch (127) receives the AC chirp signal as input, the RF switch (127) changes its connection between the reflective impedance (127.2) and the absorption impedance (127.1) at a frequency equal to the frequency of the AC chirp signal. Then, the RF antenna (128) multiplies its reflection coefficient by the RF carrier and backscatters the resulting signal (RF signal), which varies from $f_c+f_1$ to $f_c+f_2$. Note that $f_c$ is the RF carrier signal frequency and the AC chirp signal varies from $f_1$ to $f_2$.

Said RF signal is received by an RF backscatter receiver (130) which, apart from being configured for receiving the backscattered RF signal from the RF backscatter module (126), that is, from the IoT tag (120), is also configured for decoding said backscattered RF signal.

To achieve the decoding of the signal, in an embodiment, the RF backscatter receiver (130) is configured for:
multiplying the backscattered RF signal by a conjugate chirp;
applying a FFT, "Fast Fourier Transform", on the signal resultant from multiplying the backscattered RF signal by a conjugate chirp to determine energy at different FFT bins;
demodulating the resultant transformed signal, such that:
symbol '1' corresponds to a peak bin at a FFT bin; and
symbol '0' corresponds to no peak at any FFT bins.

Figure 2:
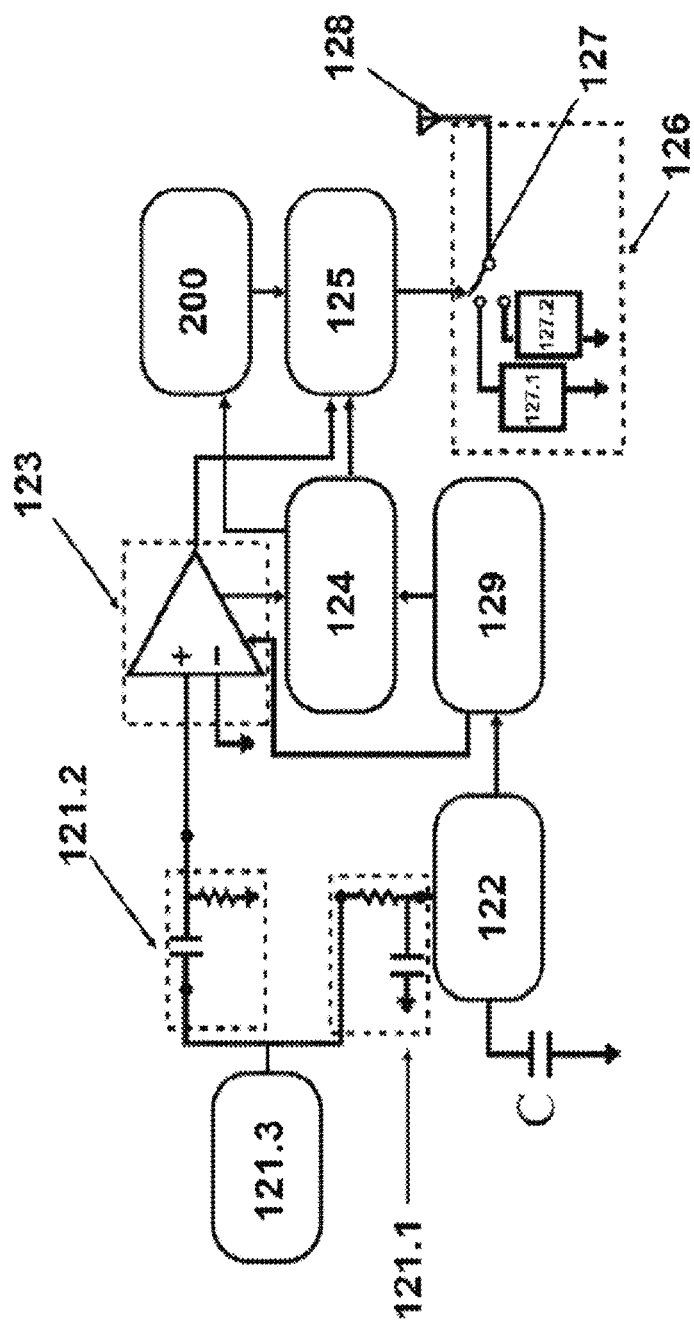
FIG. 2 This figure shows a block-diagram of a circuit comprising the main elements of an IoT tag according to an embodiment of the present invention.

FIG. 2 shows a block-diagram of a circuit comprising the main elements of an IoT tag (120) according to an embodiment of the present invention.

In particular, a LiFi receiver (121) of the IoT tag (120) comprises a solar cell (121.3) configured for receiving the optical signal from a LiFi transmitter (110), converting the optical signal into an electrical signal, and sending the electrical signal downstream of the IoT tag (120). In an example, the LiFi receiver comprises an array of solar cells (121.3). The LiFi receiver (121) and the LiFi transmitter (110) are not shown in this FIG. 2.

Following to the reception of the optical signal by the solar cell (121.3), the DC and AC components at the output of the solar cell (121.3) are separated using a low pass filter, 'LPF', (121.1) and a high pass filter, 'HPF', (121.2), both of each arranged in respective branches of the block-diagram shown.

In particular, The DC component of the signal is blocked by the capacitor in the branch of the HPF (121.2) and passes through the branch of the LPF (121.1) for harvesting energy into the harvester (122), which additionally comprises a capacitor (C) for the energy storage. Said harvester (122) is also configured for harvesting energy from ambient light. On the other hand, the AC component flows through both branches but it is highly attenuated by the capacitor of the LPF (121.1) branch.

As it can be seen, the capacitor and resistance arranged in the HPF (121.2) branch function also as filtering means configured for rectifying the low frequency noise from ambient lighting.

In an embodiment wherein the LiFi receiver of the IoT tag (120) comprises an array of solar cells (121.3), the LiFi receiver (121), besides, comprises a solar cells configuration module (not shown in the figure) configured for measuring the energy harvested in the harvester (122). If the energy measured is equal or above a predefined threshold, the solar cells configuration module connects the array of solar cells (121.3) in series, and if the energy measured is below a predefined threshold, it connects the array of solar cells (121.3) in parallel.

In an embodiment, this threshold depends on the minimum voltage that the IoT tag needs to operate with a certain margin. In an example, the minimum voltage required is 2.4V so the threshold is set to 2.6V to keep a margin of 0.2V. As mentioned before, if the voltage level at harvester drops to 2.6V, then the solar cells switch to parallel connections to facilitate the harvesting and prevent the system from entering an under voltage condition.

The separated AC component of the optical signal, i.e., analog signal, received by the solar cell (121.3) of the LiFi receiver (121) of the IoT tag (120), contains downlink data signals and chirp signals, in particular up-chirp signals. The AC component is then processed by a comparator (123) configured for digitalizing said AC component. As it is depicted, the comparator (123) comprises two outputs, one directed to a controller (124), providing the AC component of the downlink data that has been digitalized, and another output directed to a signal selector (125), providing the AC component of the chirp signal.

As it can be seen, the IoT tag (120) further comprises the controller (124) mentioned before, which is configured for processing the downlink data of the digitized electrical signal. In the particular embodiment shown, the controller (124) is a microcontroller unit. In this embodiment, the LiFi transmitter (110) communicates with the IoT tag (120) sending a LiFi frame at the desired data rate, said LiFi frame comprising a packet structure that includes preamble, start frame delimiter (SFD), transmitter identifier, receiver identifier, frame length and payload.

In a particular operation mode, the IoT tag (120) is set in an energy saving mode until the IoT tag (120) is waken up when a preamble and SFD are detected.

Additionally, the block-diagram shown comprises a voltage regulator (129) configured to control the voltage supplied to the controller (124) and the comparator (123).

As previously mentioned, the embodiment of an IoT tag (120) shown further comprises a signal selector (125) which comprises a multiplexor with two inputs, the first input being connected to ground and the second input receiving the digitized AC component of the chirp signal from the comparator (123).

Additionally, the signal selector (125) is configured for receiving, from at least one external device (200) or from the controller (124), an information signal for selecting, by means of the multiplexor, the AC chirp signal or ground signal according to said information signal. Said selection is then sent by the signal selector (125) to an RF backscatter module (126). If the information signal is digital, said signal is sent directly from the external device (200) or from the controller (124) to the selector (125) but, if the information signal is analog, said signal is sent from the external device (200) to the controller (124), which processes the information signal (for example, binarizing it) so that the signal can be interpreted by the signal selector (125).

In an example, for uplink communication, the signal selector (125) comprises a multiplexor which selects between the AC chirp signal, if information signal is '1', and the ground signal, if information signal is '0'. In another example, the multiplexor selects the AC chirp signal if information signal is '0' and the ground signal if information signal is '1'.

The RF backscatter module (126) mentioned above is shown in FIG. 2. It comprises an RF switch (127) and an RF antenna (128) connected one to the other. The RF switch (127) is connectable to an absorption impedance (127.1) and to a reflective impedance (127.2) configured for, respectively, minimizing and maximizing the impedance of the RF antenna (128), that is, for minimizing and maximizing the signal reflection. The RF backscatter module (126) is configured for receiving an RF carrier signal, with frequency $f_c$ that is 868 MHz in this example, from a carrier generator. The RF backscatter module (126) is further configured for receiving, by the RF switch, the selection of AC chirp signal or ground signal made by the signal selector (125). Then, if the RF switch (127) receives a ground signal as input, the RF switch (127) is connected to the absorption impedance (127.1), which absorbs all the energy of the RF carrier signal to prevent the RF antenna (128) from backscattering any signal.

However, if the RF switch (127) receives an AC chirp signal as input, the RF switch (127) changes its connection between the reflective impedance (127.2) and the absorption impedance (127.1) at a frequency equal to the frequency of the AC chirp signal. Then, the RF antenna (128) generates an RF signal; and the RF antenna (128) backscatters the RF signal varying from $f_c+f_1$ to $f_c+f_2$. The RF signal is generated by the RF antenna (128) by multiplying the reflection coefficient thereof and the RF carrier signal.

Figure 3:
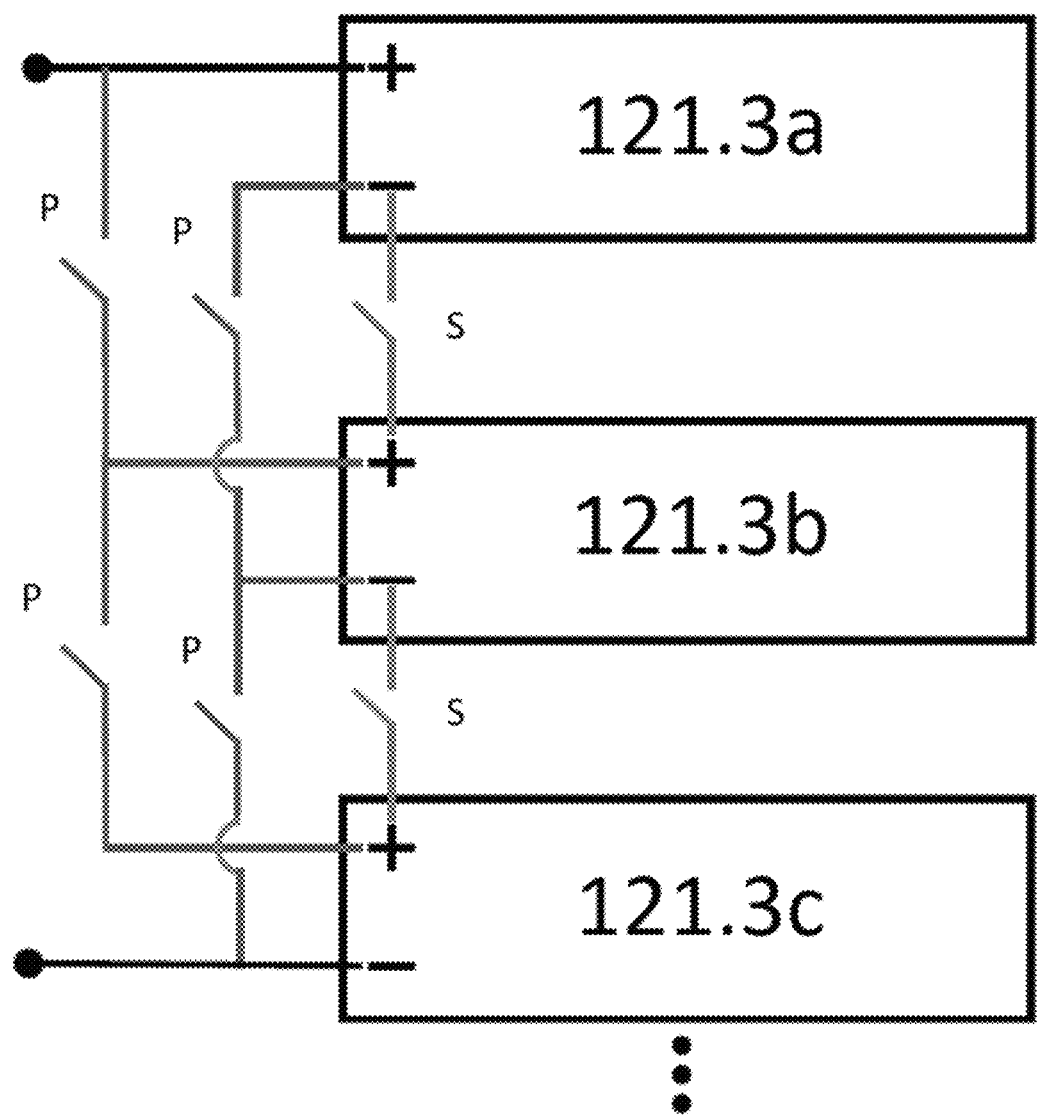
FIG. 3 This figure shows how the array of solar cells of the LiFi receiver is connected in parallel or in series by the solar cells configuration module.

FIG. 3 shows how the array of solar cells (121.3a-121.3c) of the LiFi receiver (121) is connected in parallel or in series by the solar cells configuration module. As mentioned before, in an embodiment the decision of parallel or series connection of solar cells is based on $V_{BAT}$, which is the voltage across the capacitor of the harvester (122) to store harvested energy. Said voltage is measured by the solar cells configuration module (not shown in the figure).

Thus, when $V_{BAT}$ is above a predefined threshold (which can be programmed, for example, by resistors), the energy stored is high but when $V_{BAT}$ drops below the threshold, the solar cells configuration module orders a change in the solar cells (121.3a-121.3c) connection; that is, the configuration of solar cells (121.3a-121.3c) can be switched between series and parallel. In this way, connection among solar cells (121.3a-121.3c) is reconfigurable automatically thanks to the solar cells configuration module: when harvesting is the priority due to low charge on capacitor, solar cells (121.3a-121.3c) are connected in parallel; when harvesting is not priority, to boost the communication they are connected in series. Note that, although harvesting or communication is being prioritized each time, both actions occurs simultaneously.

In this FIG. 3 the switches denoted with 'P' connect the solar cells (121.3a-121.3c) in parallel when they are closed and the rest are opened, whilst the switches denoted with 'S' connect the solar cells (121.3a-121.3c) in series when they are closed and the rest are opened. Besides, the number of solar cells (121.3a-121.3c) shown in this particular example is three, but said number can be greater or lower than it.

The invention claimed is:

1. A backscatter system comprising:
   a LiFi, "Light Fidelity", transmitter configured for generating and transmitting an optical signal comprising a sequence of a downlink data signal and a chirp signal, the chirp signal varying from a frequency $f_1$ to a frequency $f_2$;

an IoT, "Internet of Things", tag comprising:
- a LiFi receiver comprising a harvester, the LiFi receiver being configured for:
  - receiving the optical signal from the LiFi transmitter;
  - converting the optical signal into an electrical signal;
  - separating the electrical signal into a DC, "direct current", component and an AC, "alternating current", component;
  - digitalizing the AC component of the electrical signal;
  - harvesting energy from the DC component into the harvester; and
  - separating the digitalized AC component of the electrical signal into an AC downlink data signal and an AC chirp signal;
  - sending the AC chirp signal to a signal selector;
- a controller configured for:
  - receiving and processing the AC downlink data signal;
  - receiving an information signal from at least one external device and/or for generating an information signal; and
  - optionally processing the information signal;
- the signal selector comprising a multiplexor with two inputs, the first input being connected to ground and the second input being connected to the LiFi receiver for receiving the AC chirp signal, wherein the signal selector is configured for:
  - receiving, from at least one external device and/or from the controller, an information signal;
  - selecting, by means of the multiplexor, the AC chirp signal or ground signal according to the information signal;
  - sending the selection of AC chirp signal or ground signal to an RF backscatter module;
- the RF backscatter module comprising an absorption impedance, a reflective impedance, an RF switch and an RF antenna, the RF switch being connected to the RF antenna and being connectable to the absorption impedance or to the reflective impedance, the absorption impedance being configured for minimizing the reflection coefficient of the RF antenna and the reflective impedance being configured for maximizing the reflection coefficient of the RF antenna, and the RF backscatter module being configured for
  - receiving an RF carrier signal, with frequency $f_c$, from a carrier generator;
  - receiving, by the RF switch, the selection of AC chirp signal or ground signal made by the signal selector, wherein:
    - if the RF switch receives a ground signal as input:
      - the RF switch is connected to the absorption impedance;
      - the absorption impedance absorbs all the energy of the RF carrier signal to avoid that the RF antenna backscatters any signal;
    - if the RF switch receives an AC chirp signal as input:
      - the RF switch varies the impedance of the RF antenna by changing its connection between the reflective impedance and the absorption impedance at a frequency equal to the frequency of the AC chirp signal;
      - the RF antenna generates an RF signal multiplying its reflection coefficient by the RF carrier; and
      - the RF antenna backscatters the RF signal varying the frequency of the RF carrier signal from $f_c+f_1$ to $f_c+f_2$.

2. The backscatter system according to claim 1, wherein the system further comprises an RF backscatter receiver configured for
- receiving the backscattered RF signal from the RF backscatter module; and
- decoding the backscattered RF signal.

3. The backscatter system according to claim 2, wherein the RF backscatter receiver is configured to decode the backscattered RF signal by:
- multiplying the backscattered RF signal by a conjugate chirp;
- applying a FFT, "Fast Fourier Transform", on the signal resultant from multiplying the backscattered RF signal by a conjugate chirp to determine energy at different FFT bins;
- demodulating the resultant transformed signal, such that:
  - symbol '1' corresponds to a peak bin at an FFT bin; and
  - symbol '0' corresponds to no peak at any FFT bins.

4. The backscatter system according to claim 1, wherein the signal selector is configured to:
- select the AC chirp signal if information signal is '1' and selects the ground signal if information signal is '0'; and
- select the AC chirp signal if information signal is '0' and selects the ground signal if information signal is '1'.

5. The backscatter system according to claim 1, wherein the LiFi receiver comprises a comparator to carry out the digitalization of the AC component of the electrical signal.

6. The backscatter system according to claim 1, wherein the LiFi receiver comprises a voltage regulator configured to control the voltage supplied to the controller and the comparator, if any.

7. The backscatter system according to claim 1, wherein the absorption impedance is a matching circuit.

8. The backscatter system according to claim 1, wherein the chirp signal is an up-chirp signal or a down-chirp signal.

9. The backscatter system according to claim 1, wherein the LiFi receiver is further configured for harvesting energy from ambient light.

10. The backscatter system according to claim 1, wherein the LiFi receiver further comprises:
- a low pass filter configured for eliminating the AC component of the electrical signal and for obtaining the DC component of the electrical signal and for sending the DC component to the harvester; and
- a high pass filter configured for eliminating the DC component of the electrical signal and obtaining the AC component of the electrical signal.

11. The backscatter system according to claim 10, wherein the LiFi receiver further comprises at least one solar cell, the at least one solar cell being configured for:
- receiving the optical signal from the LiFi transmitter;
- converting the optical signal into an electrical signal;
- sending the electrical signal to the low pass filter and the high pass filter.

12. The backscatter system according to claim 11, wherein the at least one solar cell is an array of solar cells connectable among them in parallel or in series.

13. The backscatter system according to claim 12, wherein the LiFi receiver further comprises a solar cells configuration module, which is configured for
- measuring the energy harvested in the harvester;

if the energy measured is equal or above a predefined threshold, connecting the solar cells of the array of solar cells in series; and if the energy measured is below a predefined threshold, connecting the solar cells of the array of solar cells in parallel.

14. The backscatter system according to claim 1, wherein the harvester comprises a capacitor and/or a rechargeable battery.

* * * * *